United States Patent [19]

Persson et al.

[11] Patent Number: 5,537,434
[45] Date of Patent: Jul. 16, 1996

[54] FREQUENCY HOPPING CONTROL CHANNEL IN A RADIO COMMUNICATION SYSTEM

[75] Inventors: Bengt Persson, Djursholm; Bjorn Gudmundson, Sollentuna; Hakan Eriksson, Vallentuna, all of Sweden; Alex K. Raith, Durham, N.C.

[73] Assignee: Telefonaktiebolaget LM Ericsson, Stockholm, Sweden

[21] Appl. No.: 140,560

[22] Filed: Oct. 25, 1993

[51] Int. Cl.⁶ .................................................. H04B 1/713
[52] U.S. Cl. ........................... 375/202; 375/201; 375/203
[58] Field of Search ................................ 375/1, 201, 202, 375/203; 371/38.1

[56] References Cited

U.S. PATENT DOCUMENTS

| | | | |
|---|---|---|---|
| 4,066,964 | 1/1978 | Costanza et al. | 375/1 |
| 4,320,514 | 3/1982 | Haskell | 375/1 |
| 4,454,604 | 6/1984 | Myers | 375/1 |
| 4,476,566 | 10/1984 | Dent | 375/1 |
| 4,532,636 | 7/1985 | Wilkinson | 375/1 |
| 4,554,668 | 11/1985 | Deman et al. | 375/1 |
| 4,558,453 | 12/1985 | Mimken | 375/1 |
| 4,578,817 | 3/1986 | Rabain et al. | 375/1 |
| 4,677,617 | 6/1987 | O'Connor et al. | 375/1 |
| 4,752,939 | 6/1988 | Amoroso et al. | 375/1 |
| 4,807,248 | 2/1989 | Pyatt et al. | 375/1 |
| 4,827,507 | 5/1989 | Marry et al. | 380/38 |
| 4,829,540 | 5/1989 | Waggener et al. | 375/1 |
| 4,850,036 | 7/1989 | Smith | 455/179 |
| 5,020,056 | 5/1991 | Chennakeshu | 370/95.3 |
| 5,105,435 | 4/1992 | Stillwell | 375/1 |
| 5,111,478 | 5/1992 | McDonald | 375/1 |
| 5,121,408 | 6/1992 | Cai et al. | 375/1 |
| 5,166,953 | 11/1992 | Hershey et al. | 375/1 |
| 5,193,102 | 3/1993 | Meidan et al. | 375/1 |
| 5,307,370 | 4/1994 | Eness | 375/1 |
| 5,319,801 | 6/1994 | Richey et al. | 375/1 |
| 5,381,443 | 1/1995 | Borth et al. | 375/202 |
| 5,392,300 | 2/1995 | Borth et al. | 371/38.1 |
| 5,396,541 | 3/1995 | Farwell et al. | 375/202 |

FOREIGN PATENT DOCUMENTS

| | | |
|---|---|---|
| 329997 | 8/1989 | European Pat. Off. . |
| 2132450 | 7/1984 | United Kingdom . |
| WO91/13502 | 9/1991 | WIPO . |

OTHER PUBLICATIONS

Jean–Louis Dornstetter et al., "Cellular Efficiency with Slow Frequency Hopping: Analysis of the Digital SFH900 Mobile System", IEEE *Journal on Selected Areas in Communications*, Vol. SAC-5, No. 5, pp. 835–848 (1987).

Didier Verhulst et al., "High Performance Cellular Planning with Frequency Hopping", Article, pp. 1–8.

Didier Verhulst et al., "Slow Frequency Hopping Multiple Access for Digital Cellular Radiotelephone", IEEE *Journal on Selected Areas in Communications*, Vol. SAC-2, No. 4 pp. 563–574 (1984).

*Primary Examiner*—Salvatore Cangialosi
*Attorney, Agent, or Firm*—Burns, Doane, Swecker & Mathis

[57] ABSTRACT

A communication system having a frequency hopping scheme which provides an improved initial synchronization in mobile stations of control channels. Special synchronization bursts are inserted into the hop sequence of the control channels which, when decoded, give the mobile station the hop sequence to follow for the control channel.

49 Claims, 6 Drawing Sheets

| FRAME: | n | | | | | | | | | | | | | | | | n+1 | | | | | | | | | | | | | | | |
|---|---|---|---|---|---|---|---|---|---|---|---|---|---|---|---|---|---|---|---|---|---|---|---|---|---|---|---|---|---|---|---|---|
| SLOT: | 0 | 1 | 2 | | | | | | | | | | | | | 15 | 0 | 1 | 2 | | | | | | | | | | | | | |
| FORWARD | | | | | | | | | | | | | | | f | | f | | | | | | | | | | | | | | | |
| REVERSE | | | | | | | | | | | | | | | | r | | r | | | | | | | | | | | | | | |

| SLOT: | 0 | 1 | 2 | ... | 15 | 0 | 1 | 2 | ... |
| FRAME: | | n | | | | | n+1 | | |

Fig. 8

| FRAME: | n | | | | | | | | | | | | | | | | n+1 | | | | | | | | | | | | | | | |
|---|---|---|---|---|---|---|---|---|---|---|---|---|---|---|---|---|---|---|---|---|---|---|---|---|---|---|---|---|---|---|---|---|
| SLOT: | 0 | 1 | 2 | | | | | | | | | | | | | 15 | 0 | 1 | 2 | | | | | | | | | | | | | |
| FORWARD | f | f | f | f | f | f | f | f | | | | | | | | | f | f | f | f | f | f | f | f | | | | | | | | |
| REVERSE | | r | r | r | r | r | r | r | r | | | | | | | | | r | r | r | r | r | r | r | r | | | | | | | |

| SLOT: | 0 | 1 | 2 | ... | 15 | 0 | 1 | 2 | ... |
| FRAME: | | n | | | | | n+1 | | |

CHANNEL GROUP 0.

| FRAME: | n | | | | | | | | | | | | | | | | n+1 | | | | | | | | | | | | | | | |
|---|---|---|---|---|---|---|---|---|---|---|---|---|---|---|---|---|---|---|---|---|---|---|---|---|---|---|---|---|---|---|---|---|
| SLOT: | 0 | 1 | 2 | | | | | | | | | | | | | 15 | 0 | 1 | 2 | | | | | | | | | | | | | |
| FORWARD | | | | | | | | f | f | f | f | f | f | f | | | | | | | | | | | f | f | f | f | f | | | |
| REVERSE | r | r | r | | | | | | r | r | r | r | r | r | r | | | | | | | | | | | | | | | r | r | |

| SLOT: | 0 | 1 | 2 | ... | 15 | 0 | 1 | 2 | ... |
| FRAME: | | n | | | | | n+1 | | |

CHANNEL GROUP 1.

Fig. 9

FREQUENCY HOPPING CONTROL CHANNEL IN A RADIO COMMUNICATION SYSTEM

BACKGROUND

The present invention generally relates to cellular mobile radio communication. More specifically, the invention relates to methods and systems for efficient and flexible use of the frequency spectrum available for communication in a mobile radio communication system. The present invention also relates to base stations and mobile stations for flexible and efficient use of the frequency spectrum available in such communication systems.

Many mobile radio telephone systems of various kinds are known and in use. In all of these systems, the frequency band available for connections limits the number of possible simultaneous connections, or capacity, of the system. Two base stations or mobile stations transmitting on the same radio channel of an frequency division multiple access (FDMA) system or on the same time slot of the same radio channel in a time division multiple access CrDMA) system may interfere with each other. This kind of interference is sometimes called co-channel interference because the interference comes from the same radio channel. If the signal strength of the signals relating to one of the connections is not sufficiently strong relative to the strength of the interfering signals, the information on the first connection will then be more or less unintelligible. If the interfering mobiles or base stations are sufficiently distant from each other, however, the signals relating to the connection will be sufficiently stronger than the interference signals and the information of the connections will be received and properly decoded.

In order to be able to use the same radio channel in FDMA systems, or the same time slot of a radio channel in TDMA systems, for more than one connection, some mobile radio systems are set up as cellular systems. The geographical area to be covered by such a system is divided into smaller areas, called cells, and mobiles in a cell communicate with a base station for that cell. Some or all of the available radio channels are distributed among the cells according to a frequency plan.

A conventional frequency plan provides that different radio channels are allotted to a cluster of adjacent or neighboring cells. No two cells in the same cluster can use the same radio channel at the same time. Each radio channel used by the base station or a mobile station of one cell in a cluster, is different from every channel used by a base or mobile in another cell in the same cluster. However, cells in different clusters may use the same radio channels. Thus there can be simultaneous multiple use of a radio channel. Such multiple use is sometimes called channel or frequency re-use. The distance between cells using the same radio channel is known as the re-use distance.

Many different shapes and sizes of cell clusters are known to those skilled in the art, e.g. 3-cell, 4-cell, 9-cell, 12-cell and 21-cell clusters. Somewhat simplified, the largest call handling capacity for a cellular system is achieved when using the smallest type of cluster that provides sufficiently low co-channel interference.

Although the frequency plans described above provide the important advantage of plural use of radio channels, such fixed frequency plans are cumbersome to implement. Due to geographical variations, the cells covered by each base station antenna will vary in size and shape. The coverage area of the system will thus normally be covered by several different combinations of the known cluster configurations. Commonly, the cluster configuration, or decisions of which re-use patterns to be used, are made using complex computer simulations of the topography in the system.

Other disadvantages are also inherent in the use of fixed frequency plans. Normally, the number of desired connections in a cell varies with time and one cell may not be able to handle all desired connections because all of the channels and all of the time slots on TDMA channels allotted to the cell are occupied. At the same time the number of desired connections in an adjacent cell, or any cell in the same cluster, may be substantially less than the total capacity on all channels allotted to that cell according to the fixed frequency plan. Thus all desired connections cannot be handled by the cell cluster despite the fact that there is at least one free channel or at least a free time slot on a radio channel which could have been used for the desired connections had this not been forbidden by the fixed frequency plan.

One way of reducing the above mentioned disadvantage of fixed frequency plans is to distribute some of the radio channels available for connections in a mobile radio communication system, and to keep some radio channels in reserve. All of the channels except for the reserved channels are distributed according to a frequency plan. The reserved radio channels may be temporarily used by any cell requiting additional capacity above that provided by the channels permanently allotted to that cell in accordance with the frequency plan. Such temporary use of a reserved channel is subject to not causing co-channel interference with a connection in another cell already using that reserved radio channel. While this method of reserving and temporary allotting some radio channels provides more flexibility as regards variable connection handling capacity than a fixed frequency plan, the total handling capacity for the whole system may decrease.

A more profound method of obtaining high traffic handling flexibility in various areas of a cellular mobile radio system is to completely abolish the fixed frequency plan in favor of letting all radio channels be available for connections in all cells. Any cell may use any radio channel available for connections, provided there is sufficiently low co-channel interference from other cells currently using the same radio channel. This method of using the available radio channels is sometimes called dynamic channel allocation (DCA). While this method certainly affords advantages as regards changing call handling capacity for a cell, it also has its disadvantages.

In conventional FDMA or TDMA systems where the same radio channel is used throughout a connection, any co-channel interference will last as long as both the connections last when the transmissions occur more or less simultaneously on the same radio channel. Thus, a worst case situation must be considered in frequency planning and cell cluster design to ensure that the minimum acceptable signal quality is maintained.

Frequency hopping is a technique for ensuring that worst case interference scenarios do not prevail for longer than one frequency hop interval as opposed to the duration of the entire connection, this characteristic is commonly being known as interferer diversity. Frequency hopping also provides frequency diversity which combats fading for slowly moving mobile stations. Moreover, frequency hopping can also be used to eliminate the difficult task of frequency planning, which is of special importance in micro-cells. This can be achieved if all of the cells in a system use the same frequencies but each cell has a different hop sequence. Such systems have been called Frequency Hopping Multiple Access (FHMA).

In a frequency hopping system each cell can use all of the available frequencies, but at different times, as determined by a pseudo-random frequency hop sequence generator. Such generators can be constructed either to yield a random probability that any two cells choose the same frequency at the same time (known as non-orthogonal hopping), to guarantee that specified cells or mobile stations never choose the same frequency at the same time (known as orthogonal hopping) or a mixture of the two techniques (e.g., signals in the same cell hop orthogonally, while being non-orthogonal relative to adjacent cell signals). Today there is only one known commercial example of a frequency hopping cellular radio system. The European GSM standard describes this system, which is based on a combination of time division multiple access (TDMA) in which a 4.6 mS time cycle on each frequency channel is divided into eight, 560 µS time slots occupied by different users, and frequency hopping in which the frequencies of each of the eight time slots are independent of one another and change every 4.6 mS.

There are, however, several drawbacks associated with frequency hopping systems, in general, and the GSM standard in particular. For example, although it is rather easy to introduce FHMA for the traffic channels in the GSM system, there must also be one or more control channels (CCH) which are used for synchronization, broadcast of system information, call set-up, etc. If FHMA is also used for CCH, the initial synchronization process of the mobile station will be more complicated. However, as soon as synchronization is acquired and some broadcast information is detected, the hopping sequence will be known by the mobile station and then it will be no more difficult to receive/transmit on the control channel than on a traffic channel. Unfortunately, there is currently no known method or system for simplifying the initial synchronization of the mobile station when FHMA is used for both the traffic and control channels.

Another important characteristic of GSM is the use of mobile assisted handover (MAHO). In systems employing MAHO, the mobile station, when allocated a traffic channel, uses the idle time between active slots for measurements on the control channels of adjacent base stations. Since only a few time slots are available for such measurements, the base stations are required to transmit with constant output power on all time slots of the frequency used by the control channel. However, this constraint is detrimental in FHMA systems which are based on power control.

SUMMARY

These and other drawbacks of conventional cellular communication systems are overcome by systems and methods according to the present invention. Various exemplary embodiments of the present invention solve the problem of initial synchronization of the mobile station, discussed above, by periodically including in the forward control channel special sync bursts which are self contained and easy to detect. Each sync burst can include a pointer to, for example, the next sync burst so that once one sync burst is detected, the sequence of sync bursts will be known to the mobile station.

According to an exemplary embodiment the sync bursts also include a small amount of data which is grouped into message blocks. These message blocks contain the hop sequence information required to receive the control channel. It is then possible to read the broadcast information, which can give additional system information.

According to another exemplary embodiment of the present invention, the above-described MAHO problem can be solved by providing a time hopping TDMA system wherein the control channels and traffic channels have different hop sequences. In this way, the various control channels will randomly use different slots at different times relative to a mobile station's allocated traffic channel, thereby allowing the mobile station to measure each control channel during the mobile station's idle time. Thus, the base station need not continuously transmit during unused time slots.

BRIEF DESCRIPTION OF THE DRAWINGS

These and other features, objects, and advantages of the present invention will become more readily apparent to those skilled in the art by reading the following detailed description in conjunction with the appended figures in which.

DETAILED DESCRIPTION

Figure 1:
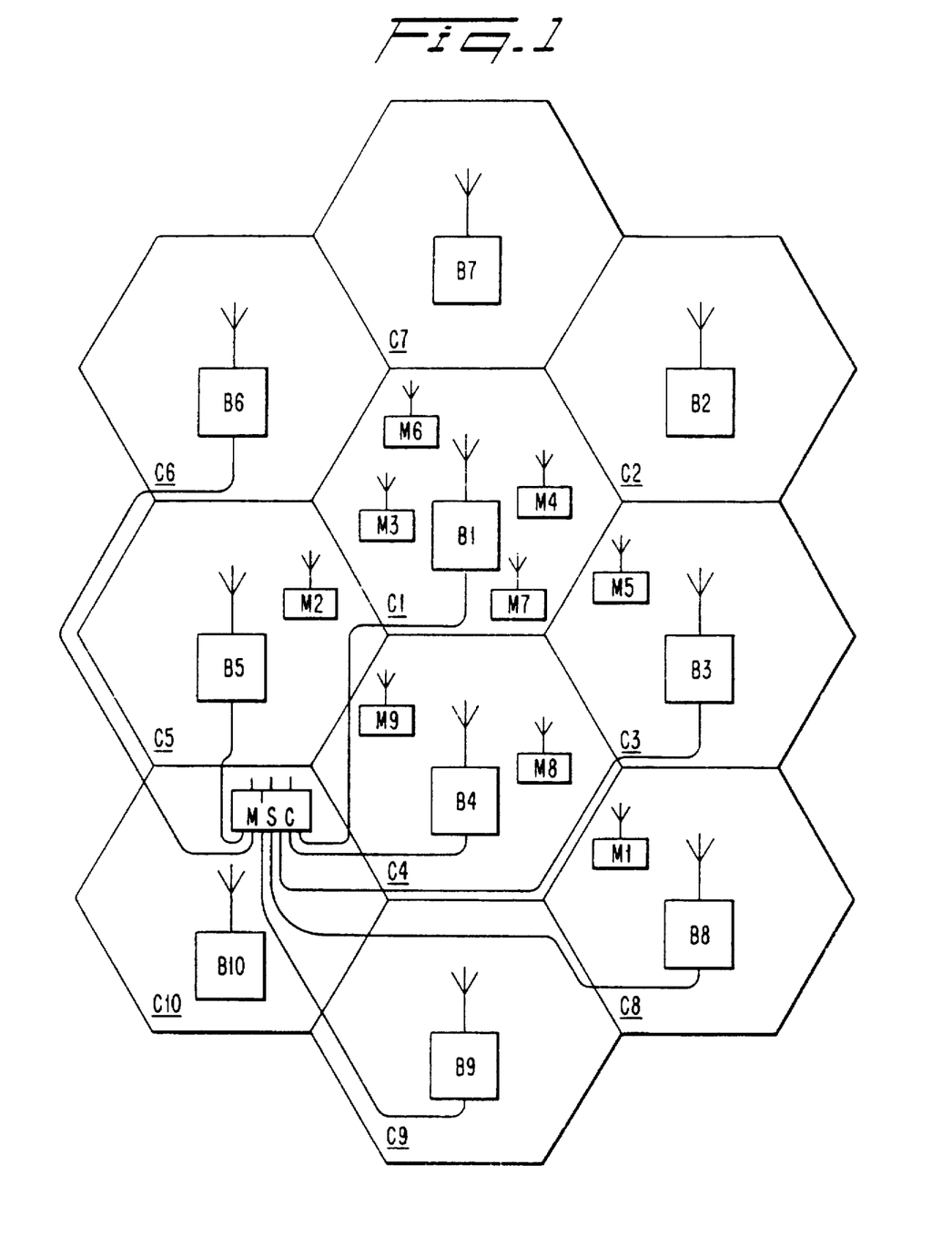
FIG. 1 illustrates an exemplary cellular system layout.

FIG. 1 illustrates ten cells C1 to C10 in an exemplary cellular mobile radio system. For each cell C1 to C10 there is a corresponding base station, denoted B1 to B10. The base stations are situated in the center of the cells and have omnidirectional antennas. Ten mobile stations, M1–M10, are also shown. They may be small hand held or vehicle mounted stations. The mobile stations are moveable within a cell and from one cell to another. A mobile switching center, abbreviated MSC, is connected to all the base stations by cables or any other fixed means, such as a radio or optical link. Some of these cables are omitted in FIG. 1 for simplicity. The MSC is also connected by cables or links to a fixed public telephone network or a similar fixed communication network (not shown).

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the lured network. For the purposes of this discussion, all of these situations are called connections irrespective of whether they originate in a mobile station or end in a mobile station.

The exemplary system of FIG. 1 is, of course, a simplification as normally the system will comprise more cells and base stations. There can, for example, be umbrella cells each covering an area also covered by a group of micro cells. Also the number of mobile stations will normally be much larger. Base stations located in the vicinity of the cell borders and with sector antennas are also common. Some cells may be served by more than one base station. Several other MSCs with connected base stations will also normally exist and the mobile stations are usually also free to communicate via these other MSCs.

Figure 2:
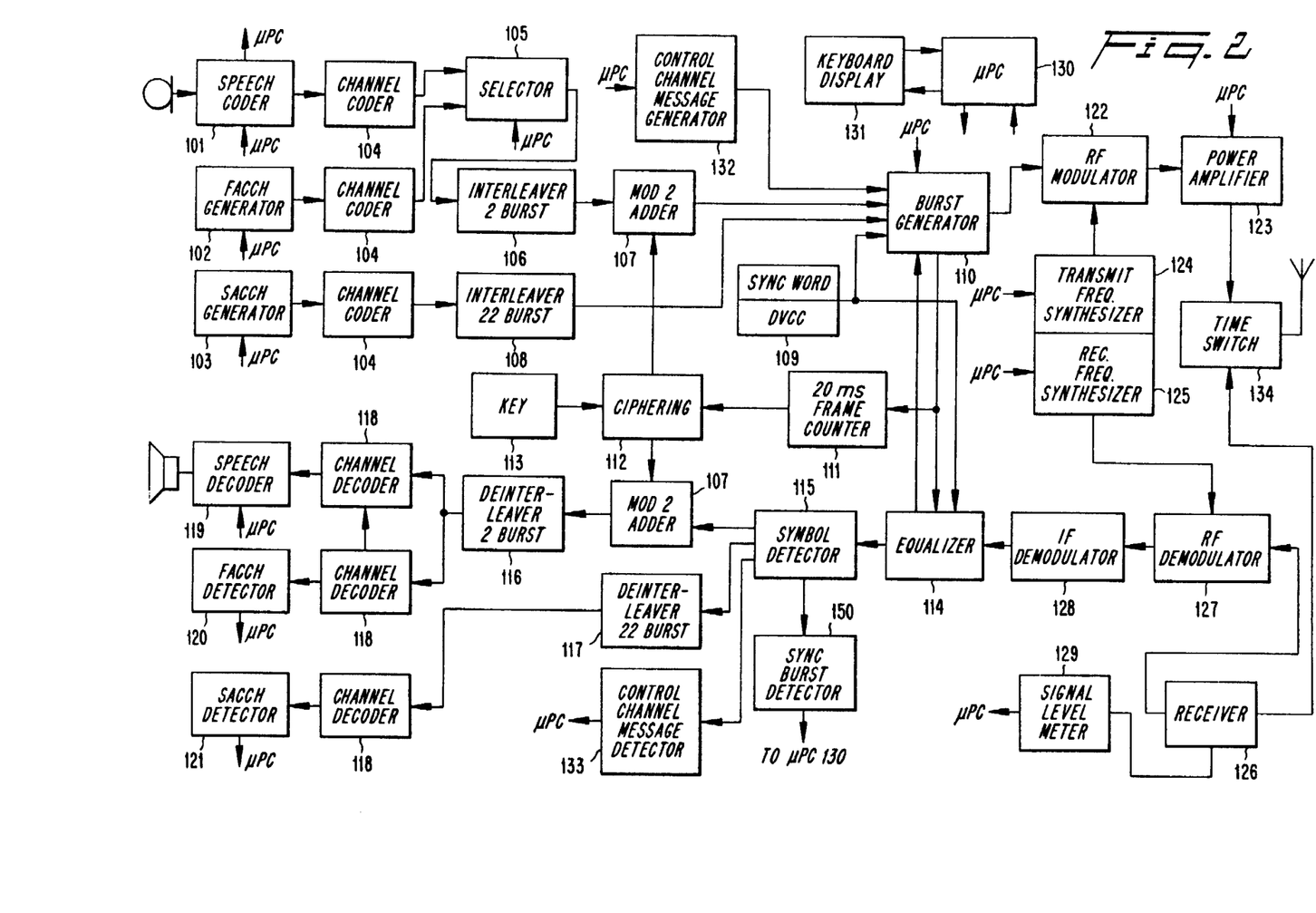
FIG. 2 is a block diagram of a mobile station according to an exemplary embodiment.
Figure 3:
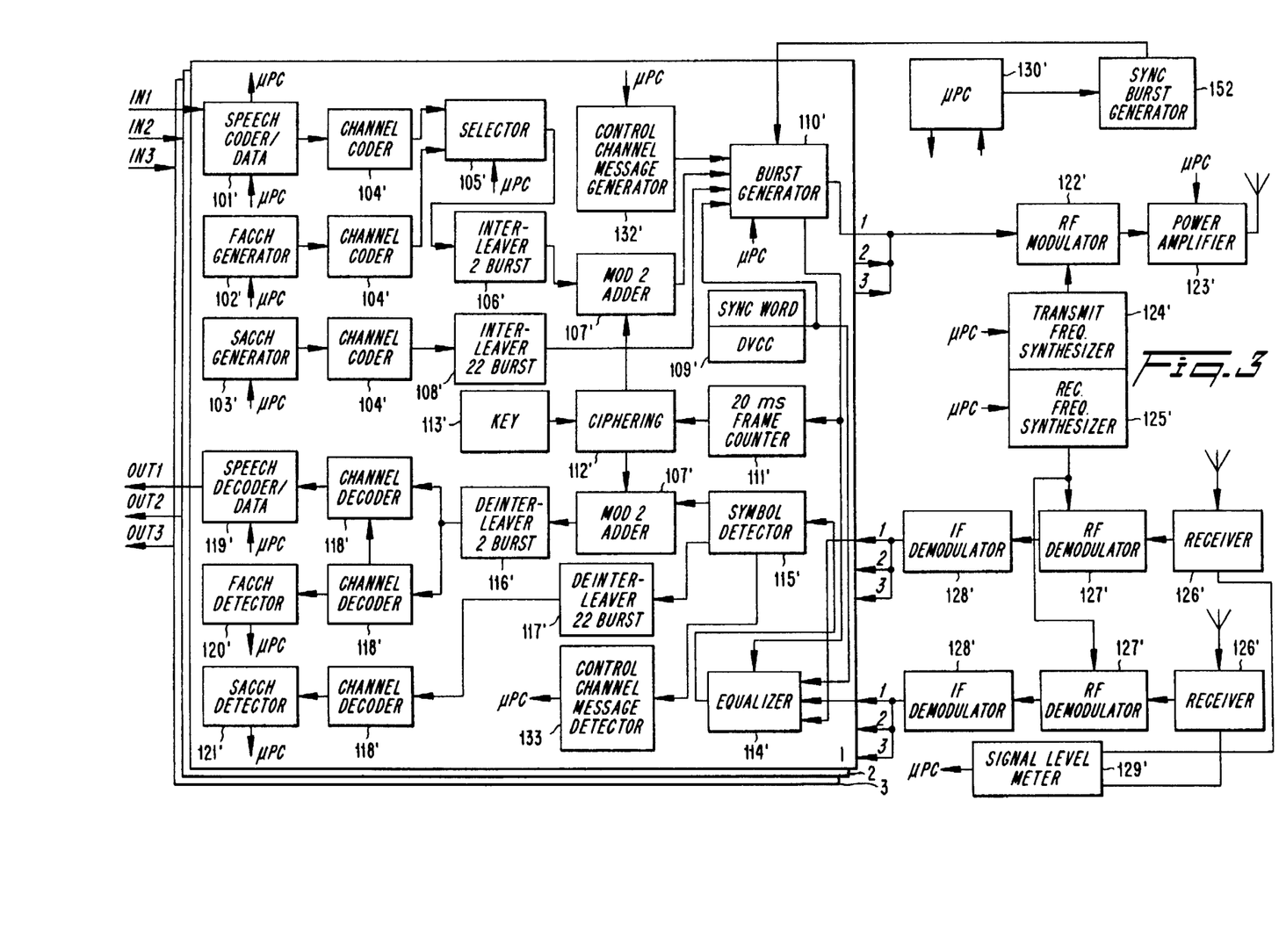
FIG. 3 is a block diagram of a base station according to an exemplary embodiment.

FIGS. 2 and 3 are block diagrams of exemplary embodiments of a mobile station and a base station, respectively, for communication on TDMA radio channels in a cellular mobile radio system. The base and mobile stations depicted therein are designed for a system according to EIA/TIA IS-54 standards which have analog and digital channels (digital control channels are planned to be added in a new standard) but also for transmission according to the present invention in a TDMA system without analog channels, such as GSM. Since communication on analog control channels may be done substantially according to standard practices, the elements of the base and mobile stations used only for analog control channels and analog traffic channels according to EIA/TIA IS-54 are not illustrated.

Normally a base station is designed for serving many mobiles, i.e., updating/monitoring and handling connections involving many mobile stations. However, to make a more intelligible drawing, FIG. 3 only illustrates those parts of a base station for handling three simultaneous connections in different time slots. Thus, for example, the base station has only three channel controllers 1, 2, and 3, each of which handles one of three connections. Furthermore, the base station has only one RF modulator and power amplifier receiving bursts from the channel controllers. Normally a base station would have many RF modulators and power amplifiers, each modulator receiving bursts from up to as many channel controllers as there are time slots in a frame.

In FIG. 3, the blocks of the base station controller corresponding to similar mobile station blocks in FIG. 2 are assigned the same reference number, but with an apostrophe. A very brief description of the purpose or operation of each block will be given first to acquaint the reader with the general operation of this exemplary system.

Corresponding blocks in the base station are assumed to have similar purpose and operation unless otherwise noted.

A speech coder 101 in the mobile station converts the analog signal generated by a microphone subjected to the human voice, or data received from a data source (not illustrated), into a bit data stream. This data stream is then divided into data packages according to the TDMA principle. The speech/data coder 101' in the base station converts incoming digital information into data packages of the same type as the speech coder 101 in the mobile station.

According to the EIS/TIA IS-54 standards there is a fast associated control channel, FACCH, and a slow associated control channel, SACCH. The FACCH generator 102' in the base station is used during the signaling of control and supervision messages to the mobile station. The FACCH generator 102 in the mobile is used by the mobile during the signaling of control and supervision messages to the base station. A FACCH message transmitted by a base or mobile in a time slot of a frame replaces the speech or data from that base or mobile in that frame.

The SACCH is a continuous control channel, meaning that a fixed number of bits (e.g., 12) is reserved for the SACCH in each burst relating to a connection. The SACCH generator 103' in the base station is used by the base when sending signaling messages to the mobile. SACCH generator 103 in the mobile station is used by the mobile when sending signaling messages to the base station.

There is a channel coder 104 and 104' connected to each of blocks 101–103, and 101' to 103', respectively. A channel coder manipulates the incoming data to make error detection and correction possible. The mechanisms used are convolutional encoding for protecting important data bits in the speech code, and cyclic redundancy check (CRC) where the perceptually significant bits in the speech coder frame, e.g., 12 bits, are used for computing a 7-bit check.

A selector 105 is connected to the channel coder 104 associated with the speech coder 101 and FACCH generator 102. The selector 105 is controlled by the microprocessor controller 130 so that, at appropriate times, user information over a particular connection is replaced with messages over the FACCH.

The two burst interleaver 106 interleaves data either from the speech coder 101 or from the FACCH generator 102 over two time slots. The 260 data bits which constitute one transmitting word, are divided into two equal parts and allotted two consecutive time slots. The effects of Rayleigh fading will be reduced in this way.

The output of the two burst interleaver 106 is connected to the input of mod 2 adder 107 so that transmitted data is ciphered, bit by bit, by logical modulo-two-addition of a pseudo-random bit-stream delivered by ciphering circuit 112.

Data transmitted over the SACCH is interleaved by the interleaver 22 burst 108 over 22 time slots, each consisting of 12 bits of information. Two SACCH messages are interleaved in parallel, i.e., the second message is delayed 11 bursts compared to the first, according to the diagonal principle.

Sync word/DVCC memory 109 is a storage device for sync words and digital verification color codes, DVCC. A 28-bit synchronization word is used for time slot synchronization and identification and also for equalizer training. Different slot identifiers are defined, one for each time slot, and another three are reserved for future development. The DVCC is a 8-bit code which is sent by the base to the mobile and vice-versa. The DVCC is used for assuring that the correct channel is decoded.

Depending on the state of operation, two kinds of bursts are generated by the base station burst generator 110'. The voice/traffic channel burst is configured by integrating 260 bits DATA, 12 bits SACCH, 28 bits SYNC, 12 bits Coded DVCC and 12 delimiter bits according to the time slot format specified by EIA/TIA IS-54.

Depending on the state of operation, two kinds of bursts are generated by the mobile station burst generator 110. The voice/traffic channel burst is configured by integrating 260 bits DATA, 12 bits SACCH, 28 bits SYNC, 12 bits Coded DVCC and 12 delimiter bits according to the time slot format specified by EIA/TIA IS-54. In a control channel burst, DATA and SACCH are replaced with data generated by the control channel message generator 132'. The transmission of a burst in a time slot of a radio channel is synchronized with the transmission of bursts in the other two time slots, if any.

Three full rate time slots make up one frame. The 20 mS frame counter 111 updates the ciphering code every 20 ms, i.e., once for every transmitted frame. A pseudo random algorithm is used for ciphering. The ciphering circuit 112 is controlled by a key which is unique for each subscriber. Key unit 113 comprises a sequencer for updating the ciphering code.

In order to cope with multipath propagation and other difficulties which cause time dispersion, an adaptive equalization method is provided by the equalizer 114' in the base station to improve signal quality. Synchronization with the burst generator 110' is provided to find the time slot associated with the right received channel. A correlation performed in the equalizer adjusts to the timing of the received bit stream. The sync word and DVCC are checked for identification reasons.

The mobile station also has an equalizer 114, for providing an adaptive equalization method to improve signal quality. A correlation performed in the equalizer adjusts to the timing of the received bit stream. The base station is the master and the mobile station is the slave regarding frame timing. The mobile station equalizer finds the incoming timing and synchronizes the burst generator. The sync word and DVCC are again checked for identification reasons.

The RF modulator 122 modulates the carrier frequency from the transmitting frequency synthesizer 124 according to the π/4-D-QPSK method (π/4 shifted, Differentially encoded Quadrature Phase Shift Keying). This technique implies that information is differentially encoded, i.e., 2 bit symbols are transmitted as four possible changes in phase: +/−π/4 and +/−3π/4.

The power amplifier 123 amplifies the signals from the RF modulator 122. The RF power emission level is selected on command by the microprocessor controller 130.

The transmitting frequency synthesizer 124' in the base station generates the transmitter carrier frequency in accordance with commands from the microprocessor 130'. When radio channel hopping is implemented, the microprocessor 130' calculates or reads which radio channel is to be used for each burst in accordance with hopping information stored in a microprocessor memory (not shown). The microprocessor 130' then sends timed instructions to the transmitter frequency synthesizer 124' to generate a sequence of carrier frequencies in accordance with the frequency hopping sequence or scheme to be used.

The transmitting frequency synthesizer 124 in the mobile station generates the transmitter carrier frequency in accordance with commands from the microprocessor 130. When radio channel hopping is implemented, the microprocessor 130 reads or calculates a sequence of radio channels to be used in accordance with the hopping information received from the base station on either the control channel during call setup or on one of the associated control channels during a handoff. The microprocessor 130 sends timed commands regarding the desired radio channel to the synthesizer 124.

The receiving frequency synthesizer 125', in the base station generates the receiver carrier frequency in accordance with commands from the microprocessor 130'. The microprocessor determines which receiver carrier is to be used for which time slot in accordance with hopping information stored in a microprocessor memory (not shown) and sends timed instructions to the synthesizer 125'.

In the mobile station the receiving frequency synthesizer 125 generates the receiver carrier frequency in accordance with the instructions from the microprocessor 130. The appropriate radio channel is read or calculated by microprocessor 130 in accordance with the hopping information received from the base station on either the control channel during call setup or on one of the associated control channels during a handoff.

Radio signals from antennas are received by receiver 126 in the mobile station and a separate receiver 126' for each antenna in the base station. The radio frequency carder from a receiver is alemodulated in a RF demodulator 127 or 127', by generating an intermediate frequency. In the IF demodulator 128 the intermediate frequency signal is demodulated, restoring the original π/4-DQPSK-modulated digital information. The received signal strength is measured by the signal level meter 129 and the value is sent to the microprocessor controller 130.

The symbol detector 115 converts the received 2-bit symbol format from the equalizer 114 into a single bit data stream. The two-burst deinterleaver 116 reconstructs the speech/FACCH data from the mod 2 adder 107 by assembling and rearranging information from two consecutive frames. SACCH data, which is spread over twenty-two consecutive frames, is reassembled and rearranged by the twenty-two burst deinterleaver 117.

The convolutionally encoded data from a deinterleaver is decoded by channel decoder 118 using the reverse of the principle used to encode the data. The received cyclic redundancy check (CRC) bits are checked to determine if any error has occurred. The channel decoder 118 for the FACCH furthermore detects the distinction between speech channel and FACCH information and directs the decoders accordingly.

The speech decoder 119 processes the received data in accordance with the speech coder algorithm, for example VSELP, and generates the received speech signal. The analog signal is finally enhanced by filtering techniques. The FACCH detector 120 detects messages on the fast associated control channel and transfers the information to the microprocessor controller 130. During a handoff, the mobile station can receive the identity of the hopping patterns to be used in the next connection on this channel.

Messages on the Slow Associated Control Channel are detected by the SACCH detector 121 and the information is transferred to the microprocessor controller 130.

The radio base station activity and the mobile station communication is controlled by the microprocessor controller 130' in the base station. Decisions are made in accordance with received messages and measurements made. When hopping is implemented, a sequence of combinations of a radio channel and a time slot channel shifting schemes are determined for each of the transmission directions for each mobile station served and involved in a connection°

The mobile station activity and the base station communication are controlled by the mobile station microprocessor controller 130, which also handles the terminal keyboard display 131 input and output. Decisions are made in accordance with received messages and measurements made. For each time slot, the transmitter and receiver radio channels will be determined according to the hopping information received and information stored in the microprocessor memory (not shown). The mobile station keyboard display 131 performs the information exchange between the user and system.

Control channel message generator 132 generates control channel messages according to orders received from the microprocessor 130. The control channel message detector 133 detects received control channel messages and sends them to the microprocessor controller 130. As mentioned earlier, elements 114'-121', 128'-130', and 132'-133' in the exemplary base station of FIG. 3, perform the same functions described above for the corresponding elements identified by nonprime numbers.

The time switch 134 in the mobile station connects either the transmitter or the receiver to the mobile station antenna. The timing is synchronized to the receiving and transmitting sequence by the microprocessor controller 130.

Having thus described exemplary components of an illustrative TDMA system, implementation of an exemplary TDMA system having both frequency and time hopping according to the present invention will now be discussed. Each traffic channel consists of one time slot on one carrier in each frame. Since both time and frequency hopping are being used, for a particular channel the time slot and carrier frequency change from frame to frame. The sequence of slots/carriers used for a particular channel is called the hop sequence. Within one cell the sequences are orthogonal, but relative to other cells they are normally pseudo-random. A method of producing apparently random sequences that have this orthogonal property is described in U.S. Pat. Ser. No. 4,476,566 entitled "Frequency Hopping Radio Communication Apparatus Having Pseudo-Random Channel Selection", which is hereby incorporated by reference.

In each cell there is normally at least one control channel. According to the present invention, the control channel uses a hop sequence in the same way as the traffic channels use hop sequences, i.e., to change time slots and frequency. The structure of the forward control channel according to exemplary embodiments provides improved initial synchronization and will now be described.

To illustrate this feature of the present invention, a TDMA frame structure having 16 time slots will be used, since such a structure more readily illustrates time slot hopping than frame structures having fewer time slots, such as that disclosed by the EIA/TIA IS-54 standard. Those skilled in the art will readily appreciate that the present invention is applicable to TDMA frame structures having any number of time slots.

Figure 4:
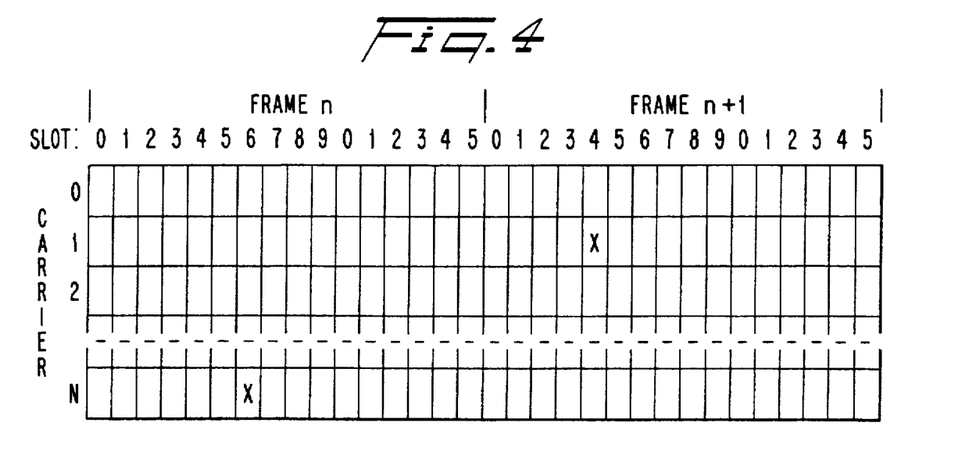
FIG. 4 illustrates time and frequency hopping according to an exemplary embodiment.

Such an exemplary system uses 60 TDMA carders, with 210 kHz carder separation, i.e., a band of 12.6 MHz. In FIG. 4 a matrix of time slots/carriers for two such TDMA frames is shown. In the frame n, a certain channel consists of one burst on carder frequency N in time slot 6, as shown by the square marked 'X' in the matrix. In the next frame n+1, the same channel uses another carrier frequency and time slot as denoted by the square marked 'X' according to the pseudo-random hop sequence. The slot/carrier used is determined by formula according to, for example, the frame number (fN), the hop sequence number (HSN), the channel offset index (COI) and the allocated frequencies (FA). One example of such a formula is that disclosed in the ETSI Technical Specification GSM 05.02, in sections 6.2.2–6.2.3. Each channel in a particular cell uses the same frame number, hop sequence number, and allocated frequencies but has a different channel offset index. This creates orthogontal channels as mentioned above. Different cells can use different hop sequence numbers to provide hop sequences that are independent of one another from cell to cell.

Figure 5:
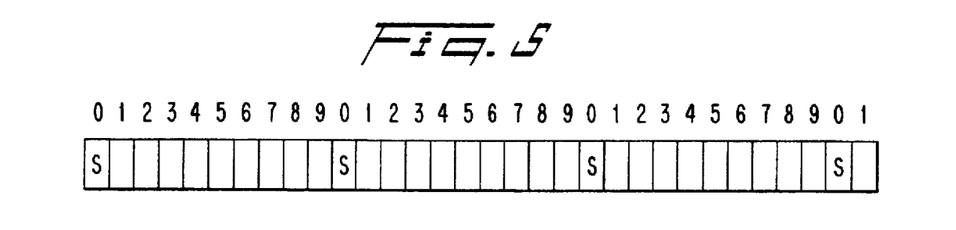
FIG. 5 illustrates the structure of a control channel according to an exemplary embodiment of the present invention.

FIG. 5 shows the structure of the control channel (CCH) according to an exemplary embodiment of the present invention. Therein, each square corresponds to one TDMA frame without indicating which slot/carrier is used for that frame. As described above, however, each of the, bursts in the control channel will vary by time slot and carrier frequency. According to this exemplary embodiment, every tenth frame a special synchronization burst, denoted by 'S' in FIG. 5, is transmitted. This special synchronization burst can be generated, for example, by the sync burst generator 152 in FIG. 3, controlled by the microprocessor 130'. Of course, the special synchronization burst could be inserted more or less frequently or it could be inserted randomly into the hop sequence.

The other frames are used for normal control channel messages, including broadcast information. The structure of those normal control channel messages can be according to any known or future system and, thus, is not further described herein. The synchronization bursts according to this exemplary embodiment consist of two parts as seen below.

The syncword is a special bit sequence which is long enough to be easily detected. The coded data is a small amount of information protected by a powerful code. An exemplary format for synchronization bursts according to the present invention is the format used in GSM which consists of a syncword of 64 bits and 25 information bits protected by 10 parity bits and 4 tail bits and a convolutional code rate of ½, yielding 78 coded data bits.

Unlike the synchronization bursts in GSM, however, according to the present invention, the 25 information bits are divided into 4 fields as shown below.

BSIC is a 6 bit base station identification code used by the mobile station to identify the base station. NEXT is a pointer to the slot/carrier for the next special synchronization burst, which will occur, in this exemplary embodiment, 10 frames later. The field consists of 4 bits for the slot number (0–15) and 6 bits for the carrier number (0–59). Of course, a greater or lesser number of bits could be used to identify the slots and/or carders depending on how many slots and/or carriers are being used in the system. Fewer bits could also be used if only a predetermined number of frequencies were used for special synchronization bursts or if the same frequency was used for all synchronization bursts in a particular hop sequence. Moreover, there could alternately be pointers to more than one of the subsequent special synchronization bursts.

The 8-bit DATA field is blocked together with the DATA fields from a number of synchronization bursts to form a repealled sequence of message blocks. The SOB field is a 1-bit flag indicating the start of the message block.

The message block contains the required hop sequence information for the control channel. It consists of, e.g., 4 DATA fields from four synchronization bursts yielding 32 information bits.

The format of a message block is as follows.

The frame number field FN is 14 bits which provides a hop cycle of 16384 frames. The hop sequence number HSN field has 6 bits giving 64 different independent hop sequences. The fields FA1 and FA2 each comprise 6 bits each for identifying a range within 60 available frequencies. With this exemplary coding, the frequency allocation (FA) is a contiguous band from FA1 to FA2. With a noncontiguous frequency allocation, longer message blocks can be used to identify the allocated frequencies. It is also assumed that by default the channel offset index is zero for the control channel, since only one control channel will include sync bursts. Alternately, the message block, or the synchronization burst itself, could identify one of a number of predetermined hop sequences.

For initial synchronization, the mobile station selects any of the carriers (or any of some predefined carriers) and starts looking for the special synchronization burst. In the exemplary mobile station illustrated in FIG. 2, the sync burst detector 150 detects the synchronization burst and sends it to microprocessor 130. If that carder frequency is one of the allocated frequencies, the synchronization burst will appear on that carrier after a random time, and will be detected by the mobile station.

The mobile station reads the NEXT pointer and can then receive each synchronization burst in sequence until it has collected one message block. If the synchronization burst includes pointers to more than one of the subsequent synchronization burst, the mobile station can continue to receive the sequence of synchronization bursts even if some are missed due to detection errors. After decoding the message block, the hop sequence is known and the mobile station can start receiving the control channel.

As an alternative to inserting a synchronization burst into the control channel the synchronization information can be transmitted using low rate code division multiple access (CDMA) overlaid on at least one of the frequencies used for the FHMA channels. This transmission can be continuous and can be synchronized to the TDMA frame structure. For example, the CDMA transmission can be a continuously repeated combination of a syncword and a message block as shown below.

The message block can contain, for example, five 8-bit code words including fields for BSIC, HSN, FN, FA1, and FA2, which fields are described above. Alternately, the syncword and message block can be transmitted in parallel using different codes or different frequencies.

Figure 9:
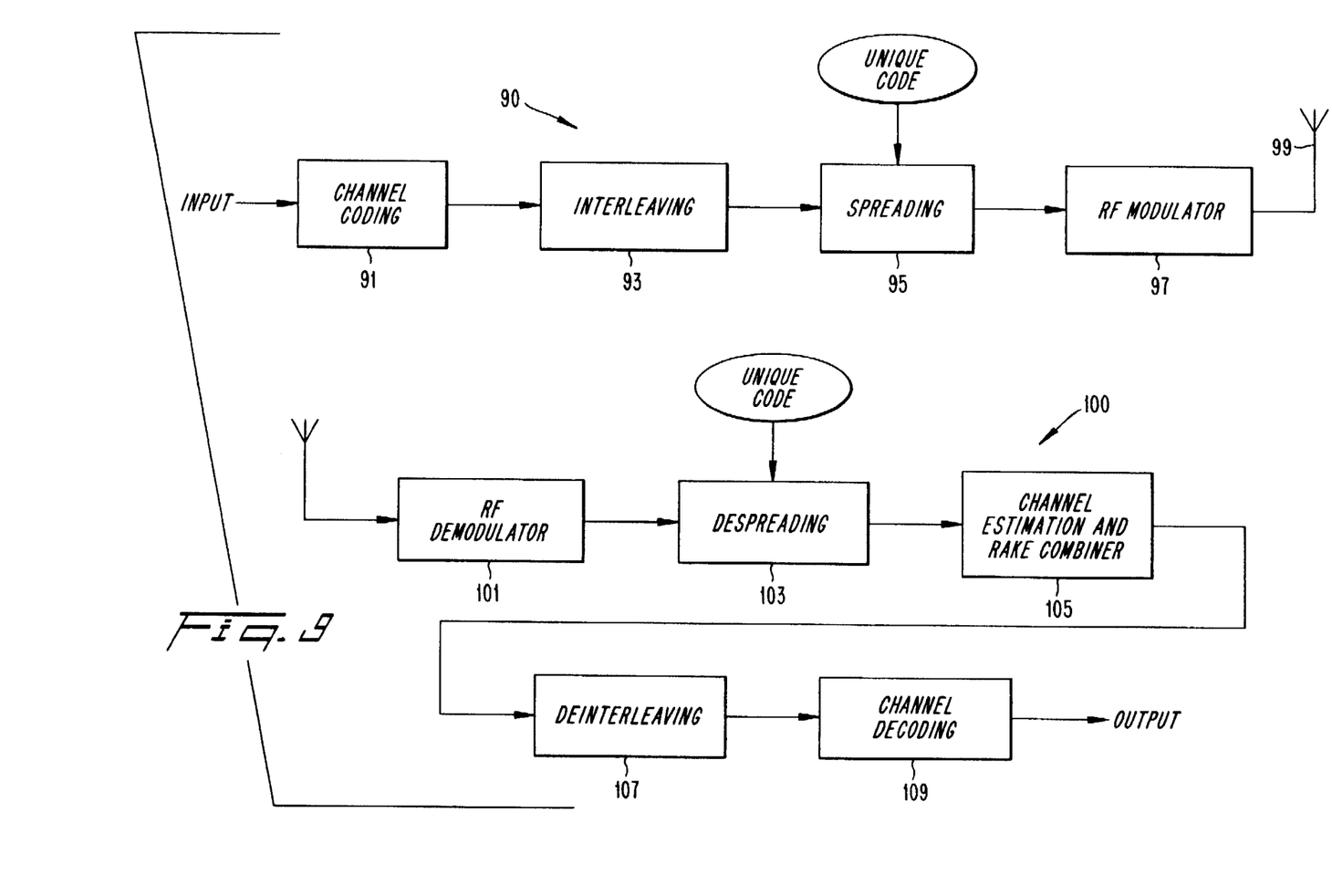
FIG. 9 is a block diagram of an exemplary CDMA transmitter and receiver which can be used in an exemplary embodiment of the present invention.

FIG. 9 illustrates an exemplary transmitter 90 and receiver 100 which could be used to provide the overlaid CDMA transmissions and receptions discussed above. In the transmitter, the syncword and message block would be input at block 91 where the syncword and message block are coded with an error correcting code. At block 93, the resulting sequence of symbols is interleaved and at block 95 the signal is spread using a unique spreading code which is known by both the transmitter and receiver. The resulting signal is then used to modulate an RF carrier at block 97 and transmitted via antenna 99.

The receiver, indicated generally at 100, then demodulates the CDMA signal at block 101 and despreads the signal at block 103 using the unique spreading code. Among other functions, the channel estimator and RAKE combiner which are represented by block 105, combine the resulting signal with echoes or pre-echoes of the same signal. The reverse functions of blocks 93 and 91 are performed in the deinterleaver 107 and channel decoding block 109, respectively.

An important feature of modem mobile telephone systems, e.g., ADC or GSM, is mobile assisted handoff (MAHO). In systems using MAHO, the mobile station, when allocated a traffic channel, uses the idle slots in the TDMA frame to make measurements on the control channels of the neighbor adjacent base stations for handoff decisions. To make these measurements, the mobile stations shall be informed about the control channels of the adjacent base stations by the current base station. This information is transmitted from the current base station on a control channel (e.g., BCCH for mobile stations in idle mode and SACCH for mobile stations in connected mode).

In systems without frequency hopping control channels, e.g., GSM, this information consists of the control channel frequencies. For a systems according to exemplary embodiments of the present invention which include frequency hopping control channels, the information can include the parameters FN, HSN, FA1 and FA2, discussed above. The timing given by the parameter FN (which can be an integral frame number or optionally can include fractions of frames) is given relative to the timing of the current base station if the base stations are not synchronized. Alternately, the information relating to the control channels can include the hop sequences of the special synchronization bursts so that the mobile station can search for the control channels in a manner analogous to the initial synchronization of frequency hopping control channels described above.

Measurement of the control channels can only be performed when the allocated traffic channel slot does not coincide with the control channel slot to be measured. This period will vary for a particular mobile station relative to a particular control channel due to the independent time hopping of control channels according to the present invention. Being informed of the hop sequences of the control channels, the mobile station can determine a suitable measurement sequence. An example of this process is described below with reference to FIG. 6.

Figure 6:
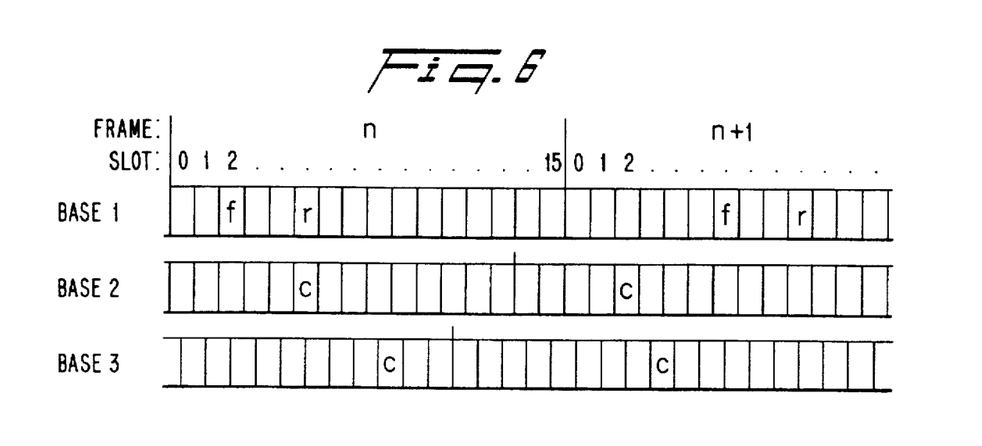
FIGS. 6–8 are matrices illustrating time slot hopping according to another exemplary embodiment of the present invention.

In FIG. 6, the time slots of transmissions from three base stations are shown. These transmissions need not be synchronized and, as can be seen in FIG. 6, the transmission of base station 3 is offset from those of base stations 1 and 2. A mobile station is connected to base station 1, using the traffic channel which includes a forward traffic channel, denoted by time slots f, and a reverse traffic channel, denoted by time slots r. The mobile station performs measurement on the control channels of the adjacent base stations 2 and 3, which are denoted by time slots c. In frame n, the traffic channel uses the second and fifth time slots. Thus, the control channel of base station 2 cannot be measured in this frame and the mobile station should instead measure the control channel of base station 3 which does not conflict with the traffic channel. The control channel of base station 2 can then be measured in the next frame, n+1, when the traffic channel used by the mobile station has hopped to the sixth and ninth time slots. (Both base station control channels can be measured in frame, n+1).

If the mobile station is to be able to measure on control channels transmitted by bits own base station, hop sequences for control channels should be selected to avoid the situation where some traffic channels always coincide with the control channel in the same cell. For example, the control channel may hop in frequency but not in time, while the traffic channel may hop in both time and frequency. In any event, the hop sequences shall still be orthogonal within the cell.

Figure 7:
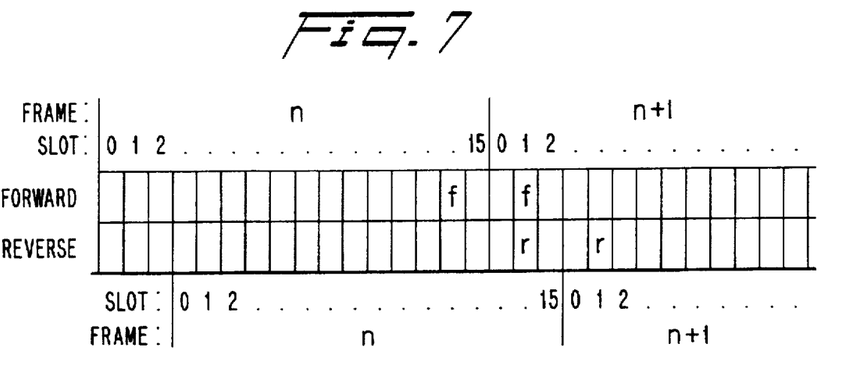

There is normally a time offset between the forward and reverse channels in TDMA systems so that the mobile station does not need to receive and transmit at the same time. This feature is illustrated in FIG. 7, where the reverse channel is delayed three time slots after the forward channel. There is an idle time of two time slots duration between the receive and transmit slots, when the mobile station can switch on the transmitter and change the synthesizer frequency.

When time hopping is used, a channel will sometimes use a late slot in one frame and an early slot in the next frame. The latter may then overlap the preceding transmit slot, or the time for frequency change may be insufficient. For example, in FIG. 7, the mobile station is both transmitting and receiving in the first time slot of frame n+1. To avoid this difficulty the time hop sequence according to this exemplary embodiment of the present invention is designed so that the time difference between two slots of the same channel always exceeds a certain value. This can, for example, be achieved if each channel hops over only some of the 16 time slots of each frame.

Figure 8:
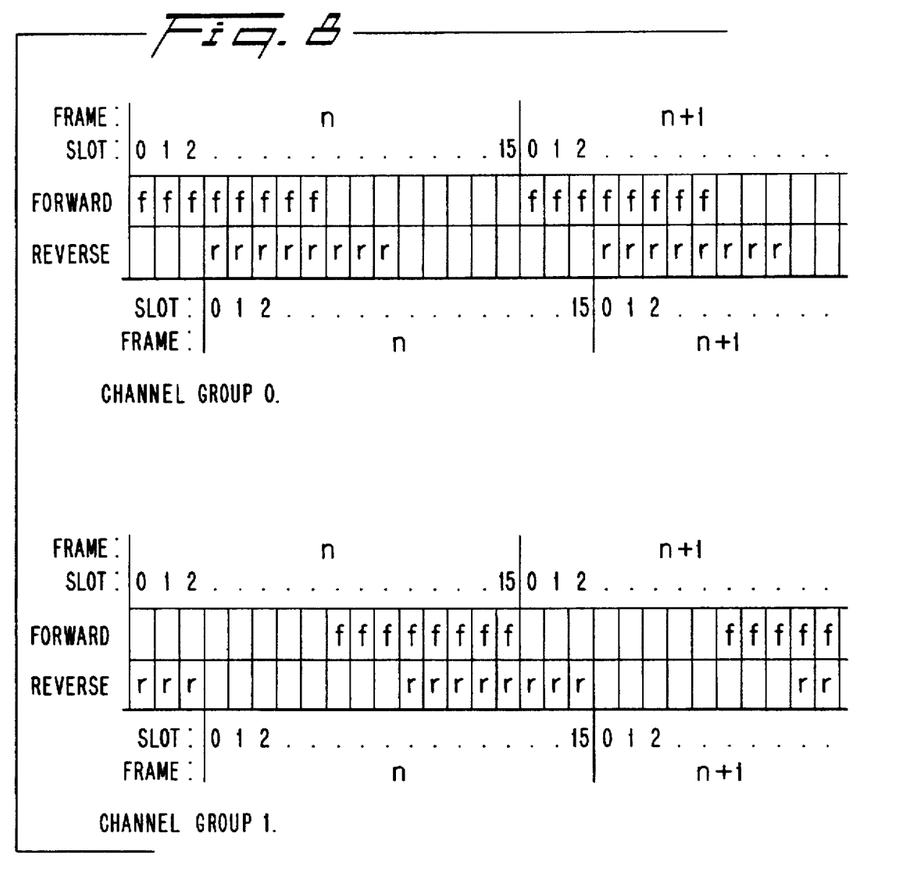

An example of this process is shown in FIG. 8, wherein the channels are divided into two groups, each hopping over 8 slots. The f's and r's in the matrix denote forward and reverse time slots which are allowed to be used for each of the groups. Note therein the gap of eight time slots which is provided in this example to eliminate the aforementioned overlap.

While the present invention has been described with respect to the foregoing exemplary embodiments, these embodiments are intended to be in all respects illustrative rather than limitive or restrictive of the present invention. Any and all modifications or changes which are within the spirit and scope of the present invention as embodied by the appended claims are intended to be encompassed thereby.

Thus, for example, although an above-described exemplary embodiment used a separation of 10 frames between special synchronization bursts, those skilled in the art will appreciate that such a separation could be greater or smaller depending on other design characteristics of the overall system. Moreover, although the above-described exemplary embodiment is discussed in terms of mobile stations, the present invention is equally applicable to any moving terminal units, e.g., portable units.

Moreover, although the exemplary embodiments of the present invention discussed above relate to TDMA systems, those skilled in the art will readily appreciate that the control channel hopping techniques are equally applicable to FDMA systems and CDMA systems having plural carrier frequencies.

What is claimed is:

1. A frequency hopping cellular radio communication system comprising:

at least one base station and at least one mobile station, the base station using a frequency hop sequence for transmitting at least one first control channel; and means, disposed in said base station, for inserting special synchronization bursts into said frequency hop sequence, such that said special synchronization bursts are transmitted as part of said at least one control channel wherein at least one of said special synchronization bursts comprise a synchronization word and a pointer indicating at least a frequency for at least a next synchronization burst, wherein said at least one mobile station uses said at least one of said special synchronization bursts to initially synchronize to said at least one first control channel.

2. The cellular radio communication system of claim 1, wherein said inserting means inserts said special synchronization bursts periodically into said frequency hop sequence.

3. The cellular radio communication system of claim 1, wherein said inserting means inserts said special synchronization bursts randomly into said frequency hop sequence.

4. The cellular radio communication system of claim 1, wherein a blocked sequence of said special synchronization bursts further comprise information defining said frequency hop sequence.

5. The cellular radio communication system of claim 4, wherein said frequency hop sequence is defined as one of a set of predetermined frequency hop sequences.

6. The cellular radio communication system of claim 4, further comprising:

means, disposed in said mobile station, for receiving said special synchronization bursts and for determining said frequency hop sequence from said frequency hop sequence information.

7. The cellular radio communication system of claim 1, wherein said at least one base station and at least one mobile station have means for communicating with one another using time-hopping TDMA and first time hop sequences, whereby time slots comprising at least one channel change from frame to frame.

8. The cellular radio communication system of claim 7, wherein the first time hop sequences are designed such that time slots of said at least first control channel do not always coincide with time slots of any particular traffic channel.

9. The cellular radio communication system of claim 7, further comprising:

at least one second base station in an adjacent cell having means for using second time hop sequences for transmitting at least one second control channel, wherein said second time hop sequences are designed such that time slots of said at least one second control channel do not always coincide with time slots of any traffic channel of said first base station.

10. The cellular radio communication system of claim 7, wherein said control channels do not time hop.

11. The cellular radio communication system of claim 7, wherein said traffic channels do not time hop.

12. The cellular radio communication system of claim 1, wherein frequency hop sequences used at said at least one base station are orthogonal to each other but pseudo-random relative to hop sequences used at other base stations.

13. The cellular radio communication system of claim 7, wherein combined frequency and time hop sequences used at said at least one base station are orthogonal to each other but pseudo-random relative to hop sequences used at other base stations.

14. The cellular radio communication system of claim 7, wherein said first time hop sequences are determined such that a spacing between any two time slots in adjacent frames used by a traffic channel is at least a predetermined number of time slots.

15. A frequency hopping cellular radio communication system comprising:

at least one first base station and at least one mobile station, the base station using a frequency hop sequence for transmitting at least one first control channel; and means, disposed in said base station, for inserting special synchronization bursts into said frequency hop sequence, wherein at least one of said special synchronization bursts comprise a synchronization word and information defining said frequency hop sequence.

16. The cellular radio communication system of claim 15, wherein said inserting means inserts said special synchronization bursts periodically into said frequency hop sequence.

17. The cellular radio communication system of claim 15, wherein said inserting means inserts said special synchronization bursts randomly into said frequency hop sequence.

18. The cellular radio communication system of claim 15, wherein said frequency hop sequence is defined as one of a set of predetermined frequency hop sequences.

19. The cellular radio communication system of claim 15, wherein said special synchronization bursts further comprise at least one pointer indicating at least a frequency for at least a next synchronization burst.

20. The cellular radio communication system of claim 15, further comprising:

means, disposed in said mobile station, for receiving said special synchronization bursts and for determining said frequency hop sequence from said frequency hop sequence information.

21. The cellular radio communication system of claim 15, wherein said at least one base station and at least one mobile station have means for communicating with one another using time-hopping TDMA and first time hop sequences, whereby time slots comprising at least one channel change from frame to frame.

22. The cellular radio communication system of claim 21, wherein said first time hop sequences are designed such that said time slots of said control channel do not always coincide with time slots of any particular traffic channel.

23. The cellular radio communication system of claim 21, also comprising:

at least one second base station in an adjacent cell having means for using a second time hop sequence for transmitting at least one second control channel, wherein said hop sequences are designed such that time slots of said control channel do not always coincide with time slots of any particular traffic channel of said at least one first base station.

24. The cellular radio communication system of claim 21, wherein said control channels do not time hop.

25. The cellular radio communication system of claim 21, wherein said traffic channels do not time hop.

26. The cellular radio communication system of claim 15, wherein frequency hop sequences used said at least one first base station are orthogonal to each other but pseudo-random to frequency hop sequences used at other base stations.

27. The cellular radio communication system of claim 21, wherein combined frequency and time hop sequences used said at least one first base station are orthogonal to each other but pseudo-random to frequency hop sequences used at other base stations.

28. The cellular radio communication system of claim 21, wherein said first time hop sequences are determined such that a spacing between any two time slots in adjacent frames used by any particular traffic channel is at least a predetermined number of time slots.

29. A frequency hopping cellular radio communication system comprising:

at least one base station and at least one mobile station, the base station having means for using a frequency hop sequence for transmitting at least one control channel; and means, disposed in said base station, for transmitting using Code Division Multiple Access overlaid on at least one frequency used by said base station, special synchronization information comprising a synchronization word and information defining said frequency hop sequence.

30. The cellular radio communication system of claim 29, wherein said frequency hop sequence is defined as one of a set of predetermined frequency hop sequences.

31. The cellular radio communication system of claim 29, further comprising:

means, disposed in said mobile station, for receiving said special synchronization information and for determining said frequency hop sequence from said frequency hop sequence information.

32. The cellular radio communication system of claim 29, wherein said at least one base station and said at least one mobile station also have means for communicating with one another using time-hopping TDMA and first time hop sequences, whereby time slots comprising at least one channel change from frame to frame.

33. The cellular radio communication system of claim 32, wherein said first time hop sequences are means for controlling transmission such that said time slots of said control channel do not always coincide with time slots of any particular traffic channel.

34. The cellular radio communication system of claim 32, also comprising:

at least one second base station in an adjacent cell having means for using a second time hop sequence for transmitting at least one second control channel, wherein said second time hop sequences are designed such that time slots of said at least one second control channel do not always coincide with time slots of any particular traffic channel of said at least one first base station.

35. The cellular radio communication system of claim 32, wherein said control channels do not time hop.

36. The cellular radio communication system of claims 32, wherein said traffic channels do not time hop.

37. The cellular radio communication system of claim 29, wherein frequency hop sequences used at said at least one first base station are orthogonal to each other but pseudo-random to frequency hop sequences used at other base stations.

38. The cellular radio communication system of claim 32, wherein combined frequency and time hop sequences used at said at least one first base station are orthogonal to each other but pseudo-random to frequency hop sequences used at other base stations.

39. The cellular radio communication system of claim 34, wherein said first time hop sequences are determined such that the spacing between any two time slots in adjacent frames used by any particular traffic channel is at least a predetermined number of time slots.

40. A Time Division Multiple Access cellular radio communication system comprising:

at least one base station having means for transmitting using at least one control channel;

means, disposed in said at least one base station, for communicating with at least one mobile station using at least one traffic channel; and means for using time slot hopping, wherein time slots comprising at least one of said control channel and said traffic channel change from frame to frame, and including time hop sequence means for controlling hopping of time slots of said at least one control channel to not always coincide with time slots of said at least one traffic channel.

41. The cellular radio communication system of claim 40, wherein said at least one control channel does not time hop.

42. The cellular radio communication system of claim 40, wherein said at least one traffic channel does not time hop.

43. The cellular radio communication system of claim 40, wherein time hop sequences are determined such that a spacing between any two time slots in adjacent frames used by any particular traffic channel is at least a predetermined number of time slots.

44. The cellular communication system of claim 40, also comprising means for frequency hopping at least one of said at least one control channel and at least one traffic channel.

45. The cellular radio communication system of claim 44, wherein frequency hop sequences for said at least one traffic channel at said at least one base station are orthogonal to each other but pseudo-random to frequency hop sequences used at other base stations.

46. The cellular radio communication system of claim 40, wherein information of time hop sequences for adjacent base stations control channels are transmitted to said at least one mobile station from said at least one base station using one of said at least one traffic channel and said control channel.

47. The cellular radio communication system of claim 4, wherein the information defining the frequency hop sequence is repeated in a subsequent blocked sequence.

48. The cellular radio communication system of claim 15, wherein a blocked sequence of said special synchronization bursts comprises information defining the frequency hop sequence, said information being repeated in a subsequent blocked sequence of said special synchronization bursts.

49. The cellular radio communication system of claim 40, wherein time hop sequences for said at least one traffic channel at said at least one base station are orthogonal to each other and pseudo-random to time hop sequences used at other base stations.

* * * * *